US009012008B1

(12) United States Patent
Hagopian et al.

(10) Patent No.: US 9,012,008 B1
(45) Date of Patent: Apr. 21, 2015

(54) IMPEDANCE MATCHED TO VACUUM, INVISIBLE EDGE, DIFFRACTION SUPPRESSED MIRROR

(71) Applicant: The United States of America, as represented by the Administrator of the National Aeronautics and Space Administration, Washington, DC (US)

(72) Inventors: John G. Hagopian, Harwood, MD (US); Patrick A. Roman, Washington, DC (US); Sharham Shiri, Glyndon, MD (US); Edward J. Wollack, Clarksville, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 88 days.

(21) Appl. No.: 13/771,815

(22) Filed: Feb. 20, 2013

(51) Int. Cl.
*B32B 3/24* (2006.01)
*G02B 5/08* (2006.01)

(52) U.S. Cl.
CPC ............... *G02B 5/0816* (2013.01); *G02B 5/08* (2013.01)

(58) Field of Classification Search
CPC ............................... G02B 5/0816; G02B 5/08
USPC ........................................... 428/131; 359/838
See application file for complete search history.

(56) References Cited

U.S. PATENT DOCUMENTS 8,270,056 B2 * 9/2012 Tao et al. ................... 359/224.1

* cited by examiner

*Primary Examiner* — William P Watkins, III

(57) ABSTRACT

Diffraction suppressed mirrors having an invisible edge are disclosed for incident light at both targeted wavelengths and broadband incident light. The mirrors have a first having at least one discontiguous portion having a plurality of nano-structured apertures. The discontiguous mirror portion impedance matches a relatively high impedance portion of the mirror to a relatively low impedance portion of the mirror, thereby reducing the diffraction edge effect otherwise present in a conventional mirror.

20 Claims, 7 Drawing Sheets ary disk 10, shows the central bright region 14 and the plurality of concentric bright rings 12 arrayed about the central bright region 14.

IMPEDANCE MATCHED TO VACUUM, INVISIBLE EDGE, DIFFRACTION SUPPRESSED MIRROR

ORIGIN OF INVENTION

The invention described herein was made by an employee of the United States Government, and may be manufactured and used by or for the Government for governmental purposes without the payment of any royalties thereon or therefore.

FIELD

Aspects of the present disclosure relate generally to controlling light reflected from mirrors. More specifically, aspects of the present disclosure relate to controlling light reflection from mirrors to reduce edge scatter and reducing information loss from scatter between light incident on the mirror and light reflected from the mirror by patterning the mirror surface with varying densities of microstructures.

BACKGROUND

Conventional mirrors receive incident light and re-emit reflected light. Conventional mirrors include a transmissive glass substrate and a reflective coating covering the side of the mirror opposite incident light. The glass substrate is typically a thin sheet of uniform thickness. The reflective coating is typically a metallized or dielectric layer of relative uniform thickness and coverage over the substrate surface. Conventional mirrors reflect light using interactions between the magnetic portion of an electromagnetic field associated with incident light and oscillating electrons resident in the reflecting layer dielectric or metal layer. Incident light comprises photons. Operatively, incident photons interact with oscillating, free electrons, disposed within the reflective layer. The incident photons interact (e.g. collide) with free electrons in the reflective layer, thereby increasing their energy level, and causing the electrons to re-emit the energy in the form of a re-emitted photon as the electron drops back to a lower energy level. At a macro level, these re-emitted photons constitute the reflected wave front returned by the mirror when illuminated with incident light.

Conventional mirrors necessarily include a physical edge about their periphery. Because the region beyond the edge contains no oscillating electron to excite, the mirror edges constitute electric field discontinuities. The electric field edge discontinuities induce a corresponding change in the electric field of the mirror about the glass substrate adjacent to the mirror periphery, the electric field change being greatest at the mirror edge and becoming smaller from the mirror edge toward the mirror's center. This field discontinuity causes a diffraction effect in conventional mirrors whereby a portion of light incident to the glass substrate at the mirror periphery is diffracted due to the resultant impedance mismatch between the mirror and the free space beyond mirror edge. Conventional mirrors diffract about 20% of incident light outside of the core reflected image. This diffraction effect results in an effect known as an 'Airy rings' visible in the reflected image intensity profile.

FIG. 1A shows a top down, plan view of an exemplary Airy disk 10. Airy disk 10 is diffraction pattern resultant from light reflected (re-emitted) from a conventional mirror (not shown), and shows a central bright region 14 and a plurality of concentric bright rings 12 arranged concentrically about center bright region 14. FIG. 1B similarly shows a three-dimensional perspective view of Airy disk 10, shows the central bright region 14 and the plurality of concentric bright rings 12 arrayed about the central bright region 14.

Airy disks represent information loss between light incident to the mirror and the mirror reflection corresponding relative intensity of concentric bright rings to the central bright region. Since a common purpose of incorporating a conventional mirror into an optical system is to redirect light conveying information without information loss, minimizing the Airy disk associated with the mirror is desirable. However, it is thought to be impossible to avoid this effect in ordinary mirrors, and optical system designers therefore typically seek to minimize the use of mirrors when designing optical systems—particularly in systems that are extremely sensitive to information loss such as space-based observation systems and lithographic workstations for semiconductor manufacturing. This is because, at the edges of conventional mirrors, the electric field discontinuities that produce diffraction of light due to an impedance mismatch between the mirror and the free space beyond the edge of the mirror.

One approach to the edge diffraction effect of conventional mirrors is physical apodization. Physical apodization limits diffraction by limiting the aperture in the system, either at the primary mirror or at an aperture stop in the system. This limits surface area of the mirror receiving incident light, and approach reduces the effect of the edge impedance mismatch by limiting incident light to regions of the having a smaller amount of mismatch. Such diffraction suppression techniques results in moving the diffraction pattern features around or effectively decreasing the collecting area such that no increase in signal to noise was possible. Physical apodization also requires the use of a tapered edge that effectively directs light away from the optical system. This has not proven useful in the visible spectrum, and has primarily been used in the microwave portion of the spectrum.

Other approaches to edge diffraction in conventional mirrors are apodized intensity and patterned apodization. Apodized intensity is a technique whereby the intensity of the reflection is decreased near the edge of the mirror. Patterned apodization is technique whereby a petaled edge imposes intensity apodization through the geometry of structures constructed about the periphery of the mirror surface. Both these alternative approaches, however, do not yield a net increase in the signal to noise of the reflected light relative to the incident light, and result in nulls in specific image locations.

Consequently, there exists a need for a mirror that addresses the edge diffraction problem associated with conventional mirrors. There exists a further need for a mirror which yields an effective improvement of signal to noise in the reflected light relative to the incident light. Such a mirror should be able to be fabricated using conventional manufacturing processes and on a mature equipment set, and be suitable for enhancing imaging systems and for optical systems that convey information using light.

BRIEF DESCRIPTION OF EMBODIMENTS

An exemplary embodiment of a diffraction suppressed mirror is described. The mirror has a first layer having a top surface, a bottom surface, and a thickness. The first layer also has a first layer contiguous portion having a periphery and a discontiguous portion disposed about and abutting the contiguous portion periphery. The discontiguous portion has a plurality of nanostructures, the plurality of nanostructures defining a plurality of apertures extending from the first layer top surface, through the first layer thickness, and to the first layer bottom surface.

A second exemplary embodiment of a diffraction suppressed mirror is described. The mirror has a substrate having a top surface, a bottom surface, and a thickness. The substrate also has a centrally disposed first substrate portion having a periphery and defining a clear aperture, and a second substrate portion also having a periphery, the second substrate portion being disposed about the periphery of the first substrate portion. The second substrate portion comprises a plurality of via nanostructures arranged on a feature pitch, the vias apertures extending from the substrate top surface, through the substrate thickness, to the substrate bottom surface.

An embodiment of a broadband diffraction suppressed mirror is described. The mirror has a first transmissive layer, a first reflective layer, and a second reflective layer. The first transmissive layer has a bottom surface. The first reflective layer has a top surface, a bottom surface, and a plurality of wavelength scale features disposed within the layer, the top surface of the first reflective layer being optically coupled to at least a portion of the first layer bottom surface. The second reflective layer has a top surface and a plurality of wavelength scale features differently sized than the plurality of wavelength scale features disposed within the first reflective layer, the features disposed within the second reflective layer. The wavelength scale features of the first reflective layer have a greater size than the wavelength scale features of the second reflective layer. The first reflective layer is configured to suppress diffraction of light incident upon the mirror having a first wavelength and the second reflective layer is configured to suppress diffraction of light incident upon the mirror having a second wavelength.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Detailed illustrative embodiments are disclosed herein. While specific configurations and arrangements of the mirror, methods of using the mirror, and methods of fabricating the mirror are discussed, it should be understood that these are for illustrative purposes only. A person skilled in the pertinent art will recognize that other configurations and arrangements can be used without departing from the spirit and scope of the present description.

It will further be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. It will also be understood that, although the terms upper, lower, top, bottom, etc. may be used herein to describe various elements, these elements should not be limited by these terms. Rather, these terms serve to distinguish elements from one another within specific embodiment(s). As used herein, the term "and/or" includes any and all combinations of one or more of the associated listed items.

The discussion discusses embodiments of the mirror for use in an imaging or optical system. This is for illustrative purposes only. Embodiments of the mirror may be used in any embodiments where reducing light diffracted out of the image core into an airy ring is advantageous for system performance. For example, embodiments of the mirror described herein are suitable for incorporation into a lithographic mask suitable for improving information conveyed with narrow band (e.g. substantially monochromatic) light. Alternatively, embodiments of the mirror described herein are suitable for incorporation into NASA and/or military applications using information conveyed by broad band light (e.g. infra-red). The below description of exemplary embodiments of the mirror discusses operation of the mirror in terms of visible light. This is for illustrative purposes and non-limiting as embodiments of the mirror are configured to operate using other wavelengths and wavelength bands.

Figure 1A:
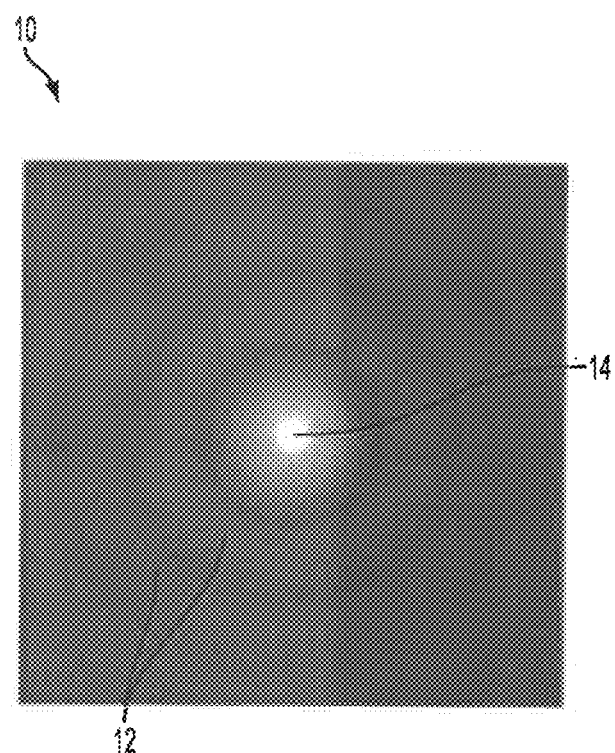
FIG. 1A shows a top down, plan view of an Airy disk.
Figure 1B:
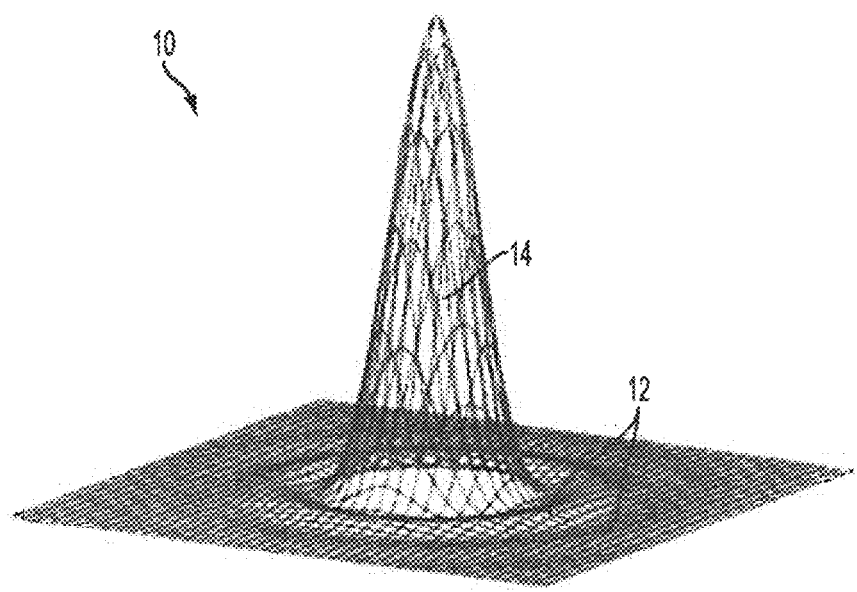
FIG. 1B shows a three-dimensional, side view of an Airy disk.
Figure 2:
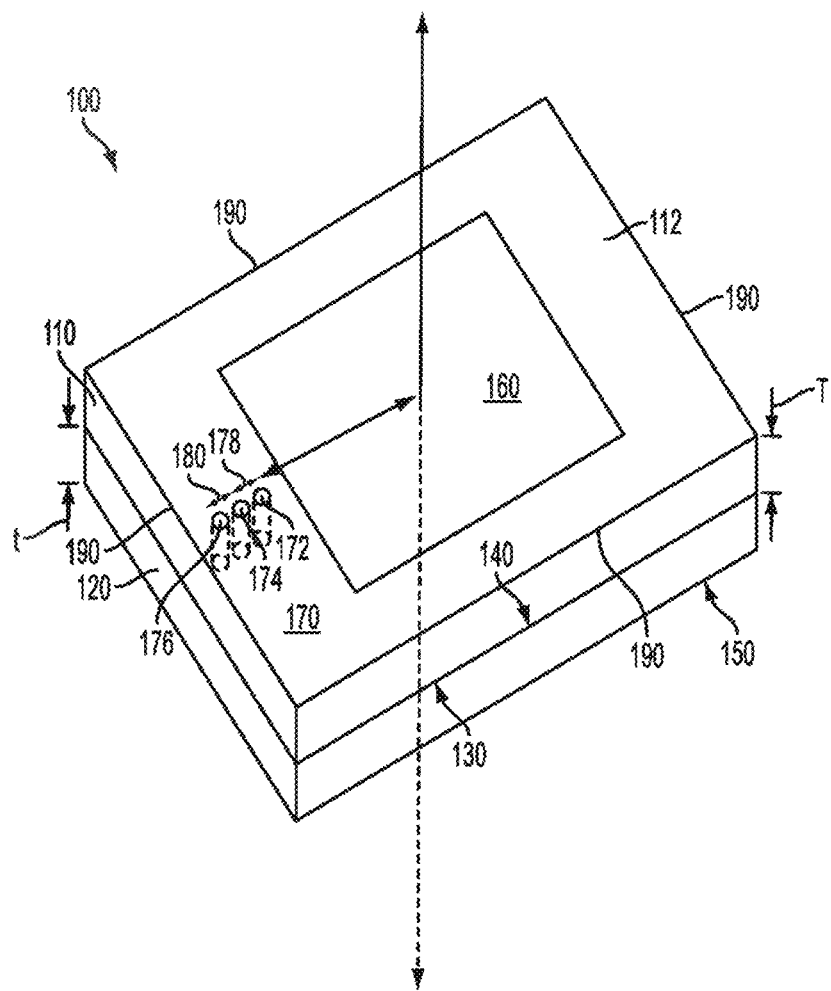
FIG. 2 shows a three-dimensional, perspective view of an exemplary embodiment of a mirror.

FIG. 2 shows an exemplary embodiment of a mirror 100. The mirror 100 comprises a first layer 110 and a second layer 120. The first layer 110 has a top surface 112, a bottom surface 130, and a thickness T. The second layer 120 has a top surface 140, a bottom surface 150, and a thickness t. The top surface 140 of the second layer 120 is disposed over at least a portion of the bottom surface 130 of the first layer 120 such that the layers are optically coupled to one another. In an embodiment, at least a portion of the first layer 120 is constructed from a transmissive material such as glass. In an embodiment, the second layer 120 comprises a reflective material such as a metal or a dielectric material. In an embodiment, the first layer 110 comprises silicon having a thickness of about 5 microns and the second layer 120 comprises aluminum having a thickness of about 100 nanometers. Operatively, mirror 100 receives incident light over at least a portion of the top surface 112, and transmits at least a portion of the incident radiation through the thickness T of the first layer 110 such that the transmitted light reaches the top surface 140 of the second layer 120. Upon reaching the second layer 120, the layer re-emits at least a portion of the light, thereby producing a reflection of the mirror.

As shown in FIG. 2, mirror 100 has a substantially rectangular shape and planar contour. Other embodiments define arcuate shapes, such as elliptical or circular shapes. In one embodiment, the mirror defines a non-planar shape, such as a concave or convex surface contour. In the embodiment shown, mirror 100 further comprises a substantially contiguous mirror portion 160 and at least one discontiguous mirror portion 170. The substantially contiguous mirror portion 160 comprises a clear aperture and has relatively high impedance similar to a conventional mirror. As will be appreciated by one of skill in the art, the non-mirror space beyond an edge 190 of the mirror has relatively low impedance. The mirror discontiguous portion 170 comprises a plurality of nanostructure apertures (172, 174, 176). The nanostructure apertures (172, 174, 176) respectively define substantially circular voids extending from the top surface 112 of the first layer to the bottom surface 150 of the second surface such that light arriving at the aperture at the top surface 112 passes through the mirror, and exits through the aperture at the mirror bottom surface 150. In an embodiment, the nanostructures (172, 174, 176) are separated by at least one pitch (178, 180). In an embodiment, an inner pitch 178 (closer to the mirror center) is greater than an outer pitch 180 (closer to the mirror edge). The discontiguous mirror portion 170 comprises lower impedance than the contiguous mirror portion, 160 and higher impedance than the non-mirror space beyond the mirror edge.

The discontiguous mirror portion 170 has the technical effect of reducing the impedance difference that would otherwise exist were the contiguous mirror portion 160 (high impedance) be bounded by non-mirror space (low impedance) by reducing the impedance difference in a stepwise manner between the mirror center and mirror edge 190. The discontiguous mirror portion creates field enhancement, the field enhancement allowing transmission through a series of apertures near the edge of the mirror and avoiding field discontinuities and diffraction at the mirror edges. In the embodiment, the apertures have lower areal coverage proximate to a center of the mirror, and increasing to a greater areal density proximate to an edge of the mirror. Advantageously, the discontiguous reflective layer has the technical effect of impedance apodization by reducing reduces the field discontinuities at the edge of the mirror that contribute to diffraction in conventional mirrors.

Figure 3:
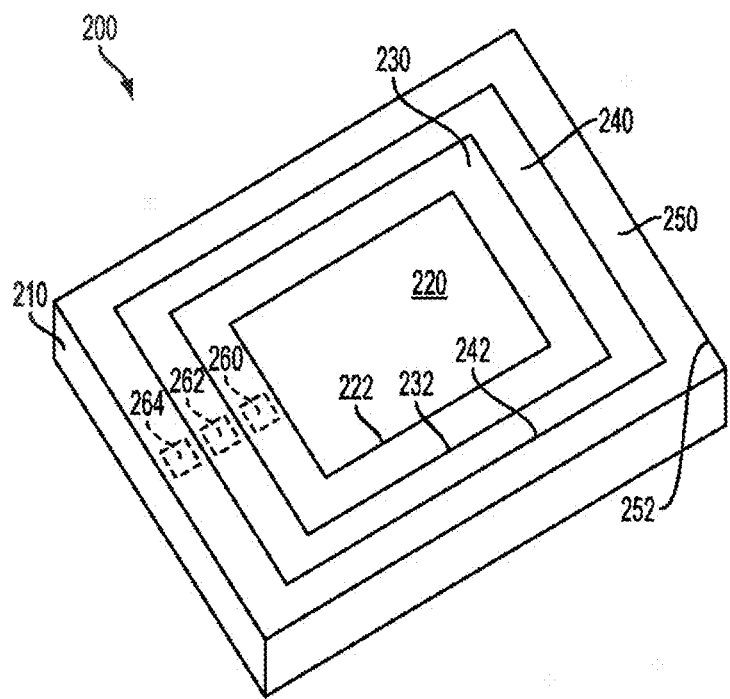
FIG. 3 shows a three-dimensional, perspective view of an second exemplary embodiment of a mirror.

FIG. 3 shows another exemplary embodiment of a mirror 200. Mirror 200 comprises a first layer 210 and a second layer (not shown). The mirror 200 comprises a first substrate portion 220, a second substrate portion 230, a third substrate portion 240, and a fourth substrate portion 250. The first substrate portion 220 comprises a continuous first region periphery 222. The second substrate portion 230 abuts the first region periphery 222, and has a continuous second region periphery 232. The third substrate portion 240 abuts the second region periphery 232, and has a continuous third region periphery 242. The fourth substrate portion 240 abuts the third region periphery 242, and defines a mirror edge 252. As further shown in FIG. 3, the second substrate portion 230 comprises a plurality of nanostructure apertures 260, the third substrate portion 240 comprises a plurality of nanostructure apertures 262, and the fourth substrate portion 250 comprises a plurality of nanostructure apertures 264. In an embodiment, the plurality of nanostructure apertures (260, 262, 264) have a critical dimension of about 500 nanometers. In an embodiment, apertures 260 are arranged on a first pitch, apertures 262 are arranged on a second pitch smaller than that of the first pitch, and apertures 264 are arranged on a third pitch smaller than that of the second pitch. In an embodiment, the first pitch is about 1.5 microns, the second pitch is about 1.2 microns, and the third pitch is about 600 nanometers.

In an embodiment, the mirror area occupied by the substrate portion (220, 230, 240, 250) have different dimensions. In an embodiment, the first substrate portion has a width of about 2.28 millimeters. In an embodiment, at least one of the second substrate portion 230, the third substrate portion 240, and the fourth substrate portion 240 has a width of about 120 microns. In an embodiment the first substrate region comprises substantially 90% of a surface area of the mirror. In an embodiment, the areal area comprising nanostructures apertures increases with increasing radial distance from the mirror center. In an exemplary embodiment, the first substrate portion has about a 0% aperture areal coverage density, the second substrate portion has about a 16% areal coverage density, the third substrate portion has about a 20% areal coverage density, and the fourth substrate portion has about a 25% areal coverage density. While counterintuitive, at this distribution of areal density of holes in the reflective layer, transmission of light will be about 100% through the holes due to local plasmon field enhancement. Advantageously, this has the technical effect of making the mirror edge invisible at the targeted incident light wavelength, and makes impedance effectively matched to free space. Advantageously, from the mirror edge to the mirror center, the areal coverage of the holes (features) decreases, and the impedance is ramped to that of an ordinary mirror, finally matching nearer the center of the mirror where there are no uncoated regions. In an embodiment, an anti-reflective coating such as magnesium fluoride is applied under the antireflective layer to prevent reflectance off an underlying substrate. In the embodiment, the substrate is itself roughened and/or blackened to absorb light that is transmitted through the holes (features).

In an exemplary embodiment, the mirror comprises a central portion having a clear aperture, first zone proximate the central portion and having a first areal density of nanostructures, a second zone proximate the first zone and having a second areal density of nanostructures, and a third zone having a third areal density of nanostructures. The clear aperture defines a mirror region having high impedance. The region of non-mirror space beyond the mirror zone defines a non-mirror region having low impedance. In the embodiment, the mirror first zone, second zone, and third zone comprise nanostructures formed from substantially circular holes extending from the top of the mirror surface to the bottom of the glass substrate, each mirror zone comprising similarly sized nanostructures defined on a zone-specific pitch and zone-specific areal coverage density. The mirror first zone defines a mirror region having an impedance less than that of the central portion and greater than the impedance of non-mirror space. The mirror second zone defines a mirror region having an impedance less than that of the mirror first zone and greater than the impedance of non-mirror space. The mirror third zone defines a mirror region having an impedance less than that of the mirror second zone and greater than the impedance of non-mirror space. Advantageously, providing a mirror zone outside of the mirror clear aperture having a pitch lower than that of the clear aperture and greater than non-mirror space reduces the impedance mismatch at the mirror edge. Advantageously, providing a plurality of mirror zones having decreasing pitch from the mirror clear aperture to the mirror edge provides a graduated mirror impedance change, thereby rendering the mirror edge substantially invisible relative to the mirror edge of a conventional mirror and reducing the misplaced information that would otherwise be present in the Airy ring of re-emitted mirror wave front.

Figure 4:
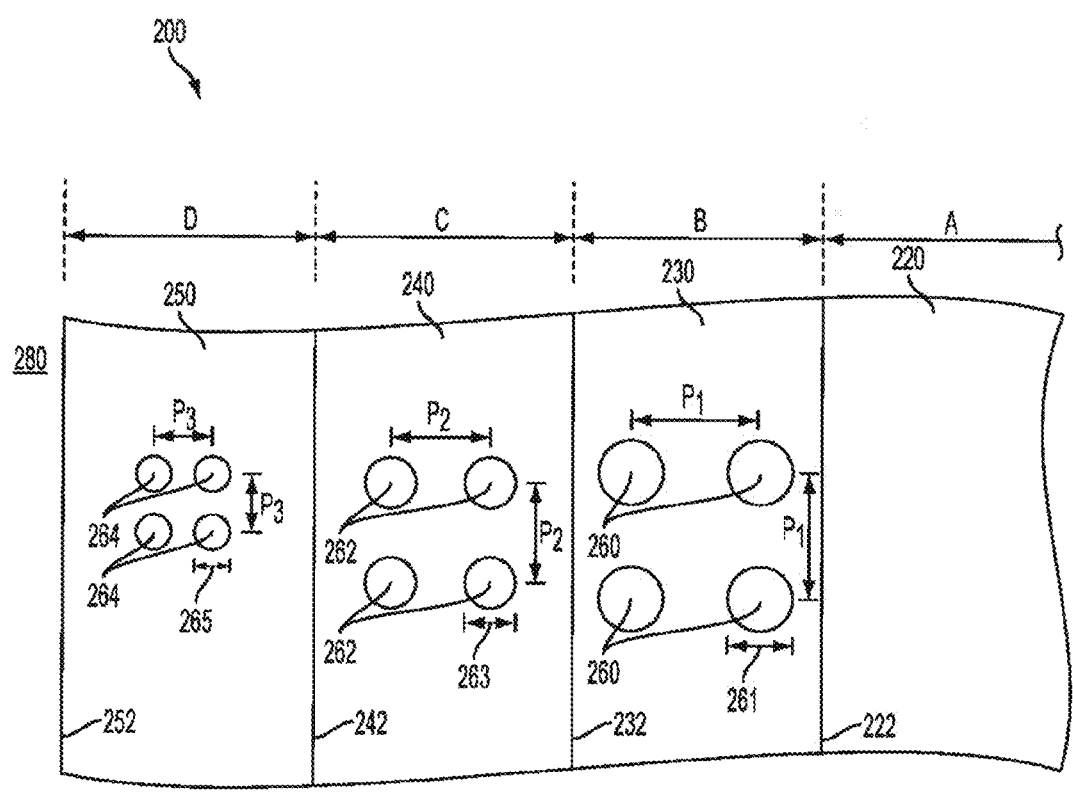
FIG. 4 shows a plan view of a portion of an exemplary embodiment of a mirror.

FIG. 4 shows a plan view of a portion of an exemplary embodiment of the mirror 200 having substrate portions (220, 230, 240, 250) with increasing aperture areal coverage densities at increasing distances from the mirror center (not shown). The mirror first substrate portion 220 comprises a clear aperture, and in the exemplary embodiment illustrated, has no nanostructures. Abutting the periphery 222 of the first substrate portion 220, the second substrate portion 230 has a plurality of substantially circular-shaped apertures 260 separated by a first pitch P1. The first mirror substrate portion has a width A, the second mirror substrate portion has a width B, the third mirror substrate portion has a width C, and the fourth mirror substrate portion has a width D. In an embodiment, the width A is 2.28 millimeters, width B is 120 microns, width C is 120 microns, and width D is 120 microns. In the illustrated embodiment, mirror 200 comprises a concentric group of substantially square mirror portions. In an embodiment, the mirror portions define concentrically arranged circular mirror portions.

Apertures 260 comprise a critical dimension 261 (e.g. a diameter) configured to interact with a specific wavelength or range of wavelengths of light incident on the mirror surface. Abutting the periphery 232 of the second substrate portion 230, the third substrate portion 240 has a plurality of substantially circular-shaped apertures 262 separated by a second pitch P2. Apertures 262 apertures comprise a critical dimension 263 (e.g. a diameter) configured to interact with a specific wavelength or range of wavelengths of light incident on the mirror surface. Abutting the periphery 242 of the third substrate portion 240 on an inner side and abutting the mirror edge 252 on an outer side, the fourth mirror substrate portion 250 has a plurality of substantially circular-shaped apertures 264 separated by a third pitch P3. Apertures 264 apertures comprise a critical dimension 265 (e.g. a diameter) configured to interact with a specific wavelength or range of wavelengths of light incident on the mirror surface. In the embodiment illustrated in FIG. 4, the pitch P1 separating apertures 260 is greater than the pitch P2 separating the apertures 262, and the pitch P2 separating apertures 262 is greater than the pitch P3 separating the apertures 264. In the embodiment illustrated in FIG. 4, the critical dimension 261 of the apertures 262 is substantially equal to the critical dimension 263 of the apertures 262, and the critical dimension 263 of the apertures 262 is substantially equal to the critical dimension 265 of the apertures 264.

In the exemplary embodiment illustrated in FIG. 4, the mirror comprises three mirror substrate portions (230, 240, 250) configured to match the relatively high impedance of the mirror clear aperture 220 to the relatively low impedance of non-mirror space 280. Substrate portions (230, 240, 250) do this by having nanostructured apertures of portion-specific size and/or pitch that reduce an impedance of the respective mirror portion in a step wise manner, smoothing the impedance mismatch (and reducing the impedance contrast) between non-mirror space 280 and the mirror clear aperture 220. For example, nanostructures 260 in second mirror portion 230 have critical dimensions 261 and/or are arranged on a pitch P1 such that portion 230 has a lower impedance than portion 220, but greater than that of portion 240. Similarly, nanostructures 262 in third mirror portion 230 have critical dimensions 263 and/or are arranged on a pitch P2 such that portion 240 has a lower impedance than portion 230, but greater than that of portion 250. Likewise, nanostructures 264 in fourth mirror portion 250 have critical dimensions 265 and/or are arranged on a pitch P3 such that portion 250 has a lower impedance than portion 240, but greater than that of non-mirror space 280. The stepwise impedance matching effected by the exemplary embodiment of mirror 200 is illustrative and non-limiting. As would be recognized by one of skill in the art in view of the teachings herein, embodiments of the mirror may have varying numbers mirror portions having 'bridging' levels impedance such that the stepwise reduction in impedance renders the mirror edge substantially invisible and/or reduces the diffraction of light otherwise characteristic in conventional mirrors. For example, in an embodiment, the mirror comprises a single mirror portion having nanostructured apertures on a radially varying pitch, thereby presenting a multiplicity of mirror portions having reduced impedance at greater radial distances from the mirror center.

In an embodiment, the nanostructured apertures comprise wavelength scale features. As used herein, the term wavelength scale feature means that the feature has at least one dimension comparable to or smaller than the wavelength of light that propagates through the microstructure. For example, in an embodiment, light incident on the mirror surface has a wavelength of about 633 nanometers and the nanostructured apertures in at least one mirror portion have corresponding critical dimensions of about 600 nanometers. Other embodiments of the mirror comprise features having different sizes corresponding approximately to substantially monochromatic light incident to the mirror surface.

Figure 5A:
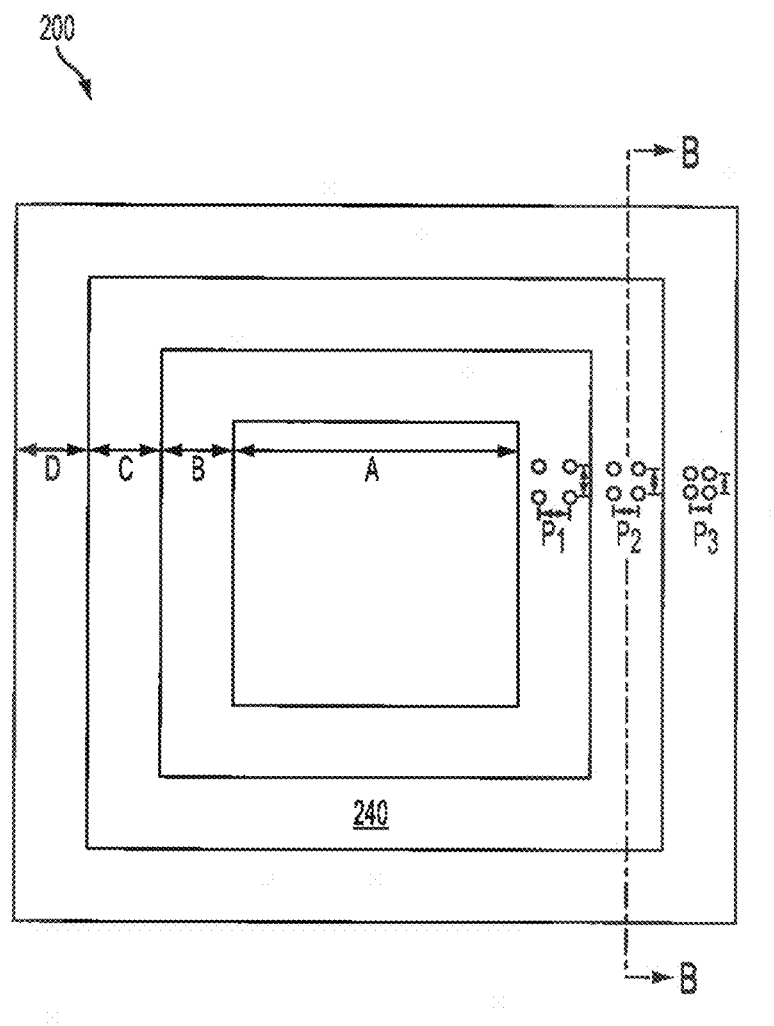
FIG. 5A shows a plan view of an exemplary embodiment of a mirror.
Figure 5B:
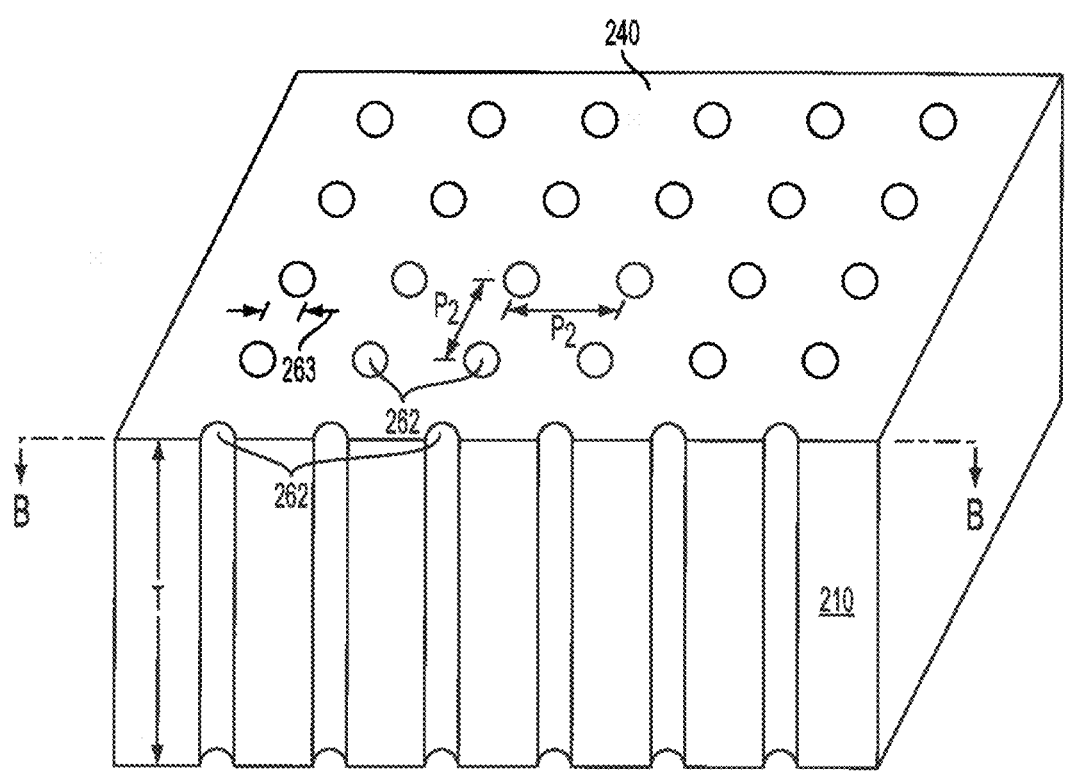
FIG. 5B shows a cross-section of a portion of an exemplary embodiment of mirror.

FIG. 5A shows a plan view mirror 200 including a section line BB taken through the mirror third substrate portion 240 and a subset of the nanostructured apertures therein. FIG. 5B shows a cross-sectional view of mirror 200 taken at section BB. As show in FIG. 5B, the nanostructured apertures 262 extend from the top surface of layer 210, and have a substantially uniform critical dimension 263 from the layer top surface to the layer bottom surface. As further shown in the figure, the apertures 262 have a height T substantially equivalent to the thickness of the layer 210. Mirror portion 240 is configured to present a discontiguous mirror surface to incident light upon the mirror surface owing to the nanostructured apertures 262 arranged across the mirror portion surface. In contrast, the clear aperture (not shown) has no apertures, and presents a substantially contiguous surface to light incident upon the mirror surface.

Figure 6:
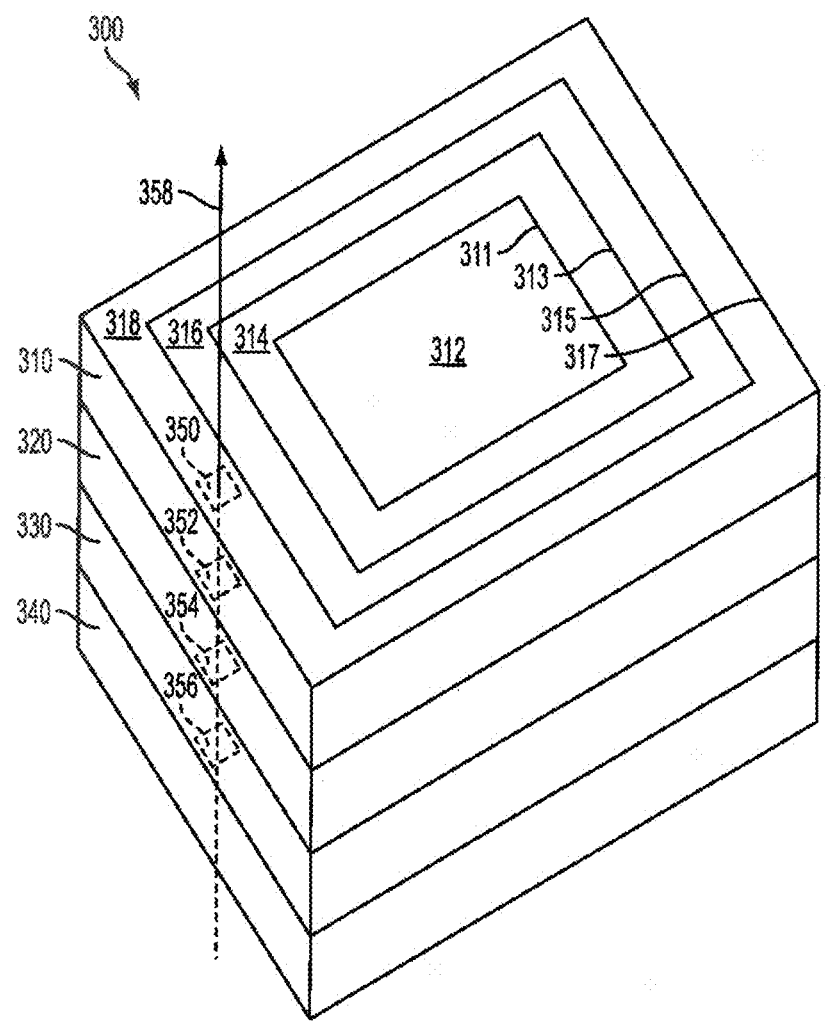
FIG. 6 shows a three-dimensional, top perspective view of another exemplary embodiment of a mirror.

FIG. 6 shows a three-dimensional, top perspective view of a mirror 300. Mirror 300 comprises a plurality of layers (310, 320, 330, 340) having at least one discontiguous layer portion, the respective discontiguous layer portion having a plurality of nanostructured apertures (350, 352, 354, 356). The nanostructured apertures (350, 352, 354, 356) are aligned relative to an axis 358 extending through the mirror and substantially orthogonal to the mirror surface, are arranged on a common pitch, and have at least two different, layer specific critical dimensions. In an embodiment, mirror 300 further comprises a reflective layer disposed over the bottom surface of the plurality of layers, the reflective layer comprising a dielectric or metal material.

In the illustrated embodiment, layers (310, 320, 330, 340) are constructed as described above, the layers having at least one discontiguous mirror substrate portion having nanostructured apertures extending from the layer top surface to the layer bottom surface. transmissive first layer (not shown), and at least two reflective layers. In the embodiment shown, mirror 100 comprises a reflective second layer 110, a reflective third layer 120, a reflective fourth layer 130, and a reflective fifth layer 140. The first layer 110 comprises a plurality of regions (112, 114, 116, 118), the first region 112 being bounded by a periphery 113, the second region 114 abutting the first region periphery 113 and having a second region periphery 115, the third region 116 abutting the second region periphery 115 and having a third region periphery 117, and the fourth region 118 abutting the third region periphery 117 and abutting an edge 119 of the mirror. At least one of the second layer regions (112, 114, 116, 118) comprises a plurality of microstructures as described above, a fourth region microstructure 111 shown illustrative in FIG. 5.

Layers 310, 320, 330 and 340 are aligned such that the plurality of nanostructured apertures 350, 352, 354 and 356 present a void extending from the top surface of layer 310 to the bottom surface of layer 340. The void (or channel) has at least two different critical dimensions corresponding to the aperture critical dimension size in at least two of the layers. In the embodiment illustrated, the plurality of apertures are aligned about a common axis 358, and comprise a first critical dimension associated with apertures 350, a second critical dimension corresponding to apertures 352, a third critical dimension associated with apertures 354, and a fourth critical dimension associated with apertures 356. In an embodiment, the first critical dimension is greater than the second critical dimension, the second critical dimension is greater than the third critical dimension, and the third critical dimension is greater than the fourth critical dimension. Advantageously, aligned nanostructured apertures layered as shown in FIG. 6 with decreasing hole size (critical dimension) configures the mirror to apodize incident light having a plurality of wavelengths, thereby having the technical effect of configuring the mirror 300 to have a substantially invisible edge to broadband incident light received at the mirror surface. In this sense, each layer (310, 320, 330, 340) impedance matches the mirror clear aperture to non-mirror space for a specific wavelength or subset of wavelengths, and collectively impedance matching the mirror across wavelengths that the constituent layers impedance. Such mirrors may also be constructed to suppress diffraction in the infra-red band or broader bands, thereby having further applications in other types of NASA instrumentation and/or military applications.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An impedance matched to a vacuum, invisible edge diffraction suppressed mirror, comprising:
    a first layer having a top surface, a bottom surface, and a thickness;
    a first layer contiguous portion having a periphery; and
    at least one first layer discontiguous portion disposed about and abutting the contiguous portion periphery, and
    wherein the first layer discontiguous portion comprises a plurality of nanostructures, the plurality of nanostructures defining a plurality of apertures extending from the first layer top surface, through the first layer thickness, and to the first layer bottom surface;
    the mirror further comprising a central portion having a clear aperture, a first zone proximate the central portion and having a first areal density of nanostructures, a second zone proximate the first zone and having a second areal density of nanostructures, and a third zone having a third areal density of nanostructures where the clear aperture defines a mirror region having high impedance and the region of non-mirror space beyond the mirror zone defines a non-mirror region having low impedance; the mirror first zone, second zone, and third zone comprising nanostructures formed from substantially circular holes extending from the top of the mirror surface to the bottom of the glass substrate, each mirror zone comprising similarly sized nanostructures defined on a zone-specific pitch and zone-specific areal coverage density.

2. The mirror of claim 1, wherein the contiguous surface portion has a first impedance and the discontiguous surface portion has a second impedance.

3. The mirror of claim 2, wherein the first impedance is greater than the second impedance.

4. The mirror of claim 1, wherein the plurality of nanostructures further comprise a critical dimension, and wherein the nanostructure critical dimension determines a range of diffraction suppressed incident light wavelengths.

5. The mirror of claim 1, further comprising:
    a second layer having a top surface, a bottom surface, and a thickness;
    a second layer contiguous surface portion having a periphery; and
    at least one second layer discontiguous portion disposed about and abutting the contiguous portion periphery,
    wherein the second layer top surface is disposed over at least a portion of the first layer bottom surface, and
    wherein the second layer discontiguous portion comprises a plurality of nanostructures, the plurality of second layer nanostructures being substantially aligned to the plurality of first layer nanostructures, the plurality of second layer nanostructures defining a plurality of apertures extending from the second layer top surface, through the second layer thickness, and extending to the second layer bottom surface.

6. The mirror of claim 5, wherein the first layer has a thickness of about 5 microns and the second layer has a thickness of about 100 nanometers.

7. The mirror of claim 5, wherein the first layer comprises silicon and the second layer comprises aluminum.

8. The mirror of claim 5, wherein the plurality of nanostructures comprise vias having a critical dimension of about 500 nanometers.

9. An impedance matched to a vacuum, invisible edge diffraction suppressed mirror, comprising:
    a substrate having a top surface, a bottom surface, and a thickness;
    a centrally disposed first substrate portion having a periphery and defining a clear aperture; and
    a second substrate portion having a periphery, the second substrate portion being disposed about the periphery of the first substrate portion,
    wherein the second substrate portion comprises a plurality of nanostructures arranged on at least one pitch, the plurality of nanostructures defining a plurality of apertures extending from the substrate top surface, through the substrate thickness, to the substrate bottom surface,
    the mirror further comprising a central portion having a clear aperture, a first zone proximate the central portion and having a first areal density of nanostructures, a second zone proximate the first zone and having a second areal density of nanostructures, and a third zone having a third areal density of nanostructures where the clear aperture defines a mirror region having high impedance and the region of non-mirror space beyond the mirror zone defines a non-mirror region having low impedance; the mirror first zone, second zone, and third zone comprising nanostructures formed from substantially circular holes extending from the top of the mirror surface to the bottom of the glass substrate, each mirror zone comprising similarly sized nanostructures defined on a zone-specific pitch and zone-specific areal coverage density.

10. The mirror of claim 9, wherein the plurality of nanostructures comprises at least three nanostructures arranged at different radial distances from a center of the mirror, a first nanostructure arranged at a first distance from the center of the mirror, a second nanostructure arranged at a second distance from the center of the mirror, and a third nanostructure arranged at a third distance from the center of the mirror;

wherein second distance is greater than the first distance and the third distance is greater than the second distance;

wherein different radial distances between radially adjacent nanostructures radially reduce an impedance of the mirror.

11. The mirror of claim 9, wherein the first substrate portion is substantially contiguous.

12. The mirror of claim 9, wherein second substrate portion nanostructures are arranged on about a 1.8 micron pitch.

13. The mirror of claim 9, wherein the second substrate portion nanostructures comprise about a 16% areal density of a surface area of the second substrate portion.

14. The mirror of claim 9, further comprising:
a third substrate portion having a periphery, the third substrate portion being disposed about the periphery of the second substrate portion,
wherein the third substrate portion comprises a plurality of nanostructures arranged on at least one second pitch, the plurality of nanostructures defining a plurality of apertures extending from the substrate top surface, through the substrate thickness, to the substrate bottom surface, and
wherein the at least one second pitch of the nanostructures in the third substrate portion is smaller than the at least one first pitch of the nanostructures in the second substrate portion.

15. The mirror of claim 14, wherein the third substrate portion nanostructures are arranged on about a 1.5 micron pitch.

16. The mirror of claim 14, wherein the third substrate portion nanostructures comprise about a 20% areal density of a surface area of the third substrate portion.

17. The mirror of claim 14, further comprising:
a forth substrate portion having a periphery, the fourth substrate portion being disposed about the periphery of the third substrate portion,
wherein the fourth substrate portion comprises a plurality of nanostructures arranged on at least one third pitch, the plurality of nanostructures defining a plurality of apertures extending from the substrate top surface, through the substrate thickness, to the substrate bottom surface, and
wherein the at least one third pitch of the nanostructures in the fourth substrate portion is smaller than the at least second pitch of the nanostructures in the third substrate portion.

18. The mirror of claim 17, wherein the fourth substrate portion nanostructures are arranged on about a 600 nanometer pitch.

19. The mirror of claim 17, wherein the fourth substrate portion nanostructures comprise about a 25% areal density of a surface area of the fourth substrate portion.

20. An impedance matched to a vacuum, invisible edge diffraction suppressed mirror, comprising:
a first layer having a top surface, a bottom surface, a thickness, and at least one mirror portion having plurality of nanostructured apertures arranged on a pitch,
wherein the first layer nanostructured apertures have a first critical dimension; and
a second layer having a top surface, a bottom surface, a thickness, and at least one mirror portion having plurality of nanostructured apertures arranged on the pitch,
wherein the second layer nanostructured apertures have a second critical dimension smaller than the first critical dimension, the plurality of first layer nanostructured apertures being vertically aligned with the plurality of second layer nanostructured apertures so as to present a void having at least two cross-sectional dimensions to light arriving at the top surface of the first layer,
wherein at least a portion of the second layer top surface is optically coupled to the bottom surface of the first layer such that the plurality of first layer nanostructured apertures are aligned to the second layer nanostructured apertures,
wherein the at least one mirror portion of the first layer impedance matches a clear aperture of the mirror to non-mirror space for at least a first light wavelength, and
wherein the at least one mirror portion of the second layer impedance matches a clear aperture of the mirror to non-mirror space for at least a second light wavelength;
the mirror further comprising a central portion having a clear aperture, a first zone proximate the central portion and having a first areal density of nanostructures, a second zone proximate the first zone and having a second areal density of nanostructures, and a third zone having a third areal density of nanostructures where the clear aperture defines a mirror region having high impedance and the region of non-mirror space beyond the mirror zone defines a non-mirror region having low impedance; the mirror first zone, second zone, and third zone comprising nanostructures formed from substantially circular holes extending from the top of the mirror surface to the bottom of the glass substrate, each mirror zone comprising similarly sized nanostructures defined on a zone-specific pitch and zone-specific areal coverage density.

* * * * *